(12) United States Patent  
Inazumi et al.

(10) Patent No.: US 6,731,658 B1
(45) Date of Patent: May 4, 2004

(54) DATA RECORDING METHOD AND DATA RECORDING APPARATUS

(75) Inventors: Atsushi Inazumi, Tokyo-to (JP); Masahiro Ono, Tokyo-to (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

(21) Appl. No.: 09/268,613

(22) Filed: Mar. 15, 1999

(30) Foreign Application Priority Data

Mar. 20, 1998 (JP) .......................................... P10-092674

(51) Int. Cl.[7] .................................................. H04J 3/02
(52) U.S. Cl. ...................................... 370/537; 370/509
(58) Field of Search ................................ 370/537, 538, 370/539, 540, 503, 504, 506, 468, 474, 389, 509, 516, 533; 386/46, 48, 98, 95; 375/376, 355, 344

(56) References Cited

U.S. PATENT DOCUMENTS

| | | | | |
|---|---|---|---|---|
| 5,566,174 A | * | 10/1996 | Sato | 370/517 |
| 5,648,960 A | | 7/1997 | Sakazaki et al. | 370/498 |
| 5,781,599 A | * | 7/1998 | Shiga | 375/376 |
| 5,818,539 A | * | 10/1998 | Naimpally | 348/512 |
| 5,901,149 A | * | 5/1999 | Itakura | 370/468 |
| 5,914,962 A | * | 6/1999 | Fifmoff | 370/538 |
| 5,936,968 A | * | 8/1999 | Lyons | 370/503 |
| 5,960,006 A | * | 9/1999 | Maturi | 370/509 |
| 6,169,843 B1 | * | 1/2001 | Lenihan | 386/46 |
| 6,188,703 B1 | * | 2/2001 | Dobson | 370/537 |
| 6,292,490 B1 | * | 9/2001 | Gratacap et al. | 370/412 |
| 6,351,474 B1 | * | 2/2002 | Robinett | 370/486 |
| 6,356,567 B2 | * | 3/2002 | Anderson | 370/516 |
| 6,397,000 B1 | * | 5/2002 | Hatanaka | 386/98 |
| 6,584,509 B2 | * | 6/2003 | Putzolu | 709/240 |

* cited by examiner

*Primary Examiner*—Douglas Olms
*Assistant Examiner*—Richard M. Pizarro
(74) *Attorney, Agent, or Firm*—Ladas & Parry (57) ABSTRACT

A data recording method is provided. The data recording method includes the processes of: receiving multiplexed data including a plurality of programs from an external source; extracting at least one program out of the programs included in the received multiplexed data; and recording the extracted at least one program, wherein each of programs is divided into a plurality of packets, and the programs are time-division multiplexed as the multiplexed data by a unit of the packet. The extracting process includes the processes of: extracting the packets composing the at least one program to be extracted from the multiplexed data; generating packet number data indicating the number of the packet which is a part of the program except for the at least one program to be extracted from the multiplexed data, and which is located in the multiplexed data and located between the packet previously extracted in the packet extracting process and the packet currently extracted in the packet extracting process; and recording the packets extracted in the packet extracting process and the packet number data generated in the generating process.

22 Claims, 3 Drawing Sheets

DATA RECORDING METHOD AND DATA RECORDING APPARATUS

BACKGROUND OF THE INVENTION

1. Field of the Invention

The present invention relates to a data recording method and a data recording apparatus for extracting and recording one program data out of multiplexed data in which a plurality of program data are time-division multiplexed, and further relates to a data reproducing method and a data reproducing apparatus for reproducing the program extracted by the data recording method.

2. Description of the Related Art

The MPEG 2 (International Standard ISO/IEC 13818-1) proposed by the MPEG (moving picture expert group) is a coding system for compressing digital video and digital audio signals.

The MPEG 2 adopts a time-division multiplexing system using packets. For instance, video and audio signals are divided into streams called packets having an adequate length in multiplexing the video and audio signals by using this system and the packets of the video signal and of the audio signal are transmitted in a time-division manner while being switched appropriately.

The MPEG 2 also adopts a multiplexing and separating system accommodating to multi-programming in order to realize transmission of a plurality of program data. The use of this system allows not only video and audio signals composing one program (for example, one movie or film) to be transmitted in the time-division manner but also video and audio signals composing a plurality of programs (for example, some or more movies or films) to be transmitted in the time-division manner for example.

There is a system called a transport stream as one of such multiplexing and separating systems accommodating to multi-programming. According to this transport stream system, a PES (packetized elementary stream packet) is divided further into a plurality of packets to transmit a plurality of program data in the time-division manner. Each packet has a fixed length which is relatively short, i.e., 188 bytes in concrete.

It is necessary to synchronize an encoder provided in a transmitter and a decoder provided in a receiver (reproducing apparatus) in order to receive and reproduce the program data transmitted in the time-division manner by adopting the transport stream system. In the transport stream system, information for setting and calibrating clock reference called PCR (program clock reference) is transmitted to synchronize the encoder and the decoder based on it.

It is necessary to recognize the value of the PCR and the time when the PCR arrives at the decoder accurately in order to synchronize the encoder and the decoder by using the PCR. In concrete, the PCR is data of six bytes and the decoder must set the value of the PCR therein at the time when the final byte of the PCR has arrived. Then, using the PCR arrival time and the value of the PCR, the decoder sets or calibrates STC (System Time Clock) which is the basis on which the decoding and reproducing processes within the decoder are performed. More specifically, the decoder has a PLL (Phase Locked Loop) circuit in which a counter outputting the STC is built in. Every time when the PCR arrives, the PLL circuit calculates a difference between the value of the PCR and the value of the STC, converts its result into a control signal and performs a feedback control based on this control signal. It then allows the STC which coincides completely with the PCR arrival period to be created and the encoder provided in the transmitter and the decoder provided in the receiver to be synchronized at high precision.

By the way, a technology for receiving multiplexed data transmitted by using the multi-programming multiplexing and separating system as described above and for recording the received multiplexed data is now being developed. When such technology is established, it becomes possible for a broadcasting station providing a digital satellite broadcasting service to multiplex and transmit a plurality of movies recorded in digital signals to each home and for each home to record the movies transmitted from the broadcasting station in the digital signals as they are.

Two methods are now being proposed as methods for recording the multiplexed data transmitted by using the multi-programming multiplexing and separating system.

A first method is to record all of the transmitted multiplexed data. This method, however, has problems that a data amount becomes large because all of the multiplexed data is recorded and that unnecessary program data cannot be excluded even if it is contained in the multiplexed plurality of program data.

A second method is to extract and record one program data out of the transmitted multiplexed data. This method allows recording of only the necessary program data and reduction of the data amount. However, it has a problem that it causes a trouble in the synchronization by means of the PCR in reproducing the recorded program data.

That is, when the program data once recorded is to be reproduced, it is necessary to set or calibrate the STC in the reproducing apparatus based on the PCR in the same manner with the case of receiving and reproducing the multiplexed data transmitted from the transmitter. However, there arises a problem in extracting and recording one program data out of the time-division multiplex signals that the relationship between the time when the PCR is to be read and the value of the PCR is destroyed. That is, the arrangement of the PCR is destroyed by extracting one program data. As a result, the STC of the reproducing apparatus cannot be set or be calibrated based on the PCR.

SUMMARY OF THE INVENTION

It is an object of the present invention to solve the above-mentioned problems by providing a data recording method and a data recording apparatus which can extract at least one program from multiplexed data in which a plurality of programs are time-division multiplexed, and reconstruct the extracted at least one program as a program which is independent of the multiplexed data and which can be reproduced by a reproducing apparatus at high precision.

It is a further object of the present invention to provide a data reproducing method and a data reproducing apparatus which can reproduce the program extracted from the multiplexed data by using the data recording method of the present invention.

The above-mentioned object can be achieved by a data recording method in accordance with the present invention. The data recording method includes the processes of: receiving multiplexed data including a plurality of programs from an external source; extracting at least one program out of the programs included in the received multiplexed data; and recording the extracted at least one program. Each of programs is divided into a plurality of packets, and the programs are time-division multiplexed as the multiplexed data by a unit of the packet. In this data recording method, the extracting process includes the processes of: extracting the packets composing the at least one program to be extracted from the multiplexed data; generating packet number data indicating the number of the packet which is a part of the program except for the at least one program to be extracted from the multiplexed data, and which is located in the multiplexed data and located between the packet previously extracted in the packet extracting process and the packet currently extracted in the packet extracting process; and recording the packets extracted in the packet extracting process and the packet number data generated in the generating process.

By this data recording method, at least one program can be extracted from the multiplexed data, and recorded as a program independent of the multiplexed data. In the program recorded by this method, only the packets composing the extracted one program and the packet number data are arranged. That is, the packets composing the program other than this extracted program are not included in the program recorded by this method. Therefore, it is possible to make the amount of the recorded program smaller than that of the multiplexed data.

Meanwhile, the packets composing the respective programs are multiplexed in the multiplexed data. Because of this, in the multiplexed data, the packets composing one program to be extracted are placed at relatively long intervals. In contrast, in the recorded program, only the packets composing one program and the packet number data are arranged. Because of this, in the recorded program, the packets are placed without interval. Thus, the locations of the packets in the recorded program are different from the locations of the packets in the multiplexed data in time.

In order to reproduce the recorded program, it is preferable that the locations of the packets read out from the recorded program are matched with the locations of the packets in the multiplexed data in time. That is, it is preferable that the locations of the packets are restored to the state when these packets were placed in the multiplexed data.

When the recorded program is reproduced, it is possible to easily restore the locations of the packets read out from the recorded program by using the packet number data as follows. The packet number data indicates the number of packets composing other program which existed between the packets composing one program to be extracted. For example, if the packet number data indicates "3", the number of the packets composing other program which existed between two packets which are contained in one program to be extracted is three. In this case, when reproducing the recorded program, the first packet in the recorded program is firstly read out and reproduced, and then, the next packet in the recorded program is read out and reproduced after the period of time necessary for reproducing three packets has passed. Thus, the locations of the reproduced packets can be matched with the locations of the packets in the multiplexed data in time. Hence, the synchronization in a reproducing apparatus when the recorded program is reproduced can be easily established, and the recorded program can be reproduced by the reproducing apparatus at high precision.

In the data recording method of the present invention, when the packets extracted in the packet extracting process and the packet number data generated in the generating process are recorded, the packet number data may be inserted between the packet previously extracted in the packet extracting process and the packet currently extracted in the packet extracting process. As a result, the previous packet, the packet number data, and the current packet are arrayed in the recorded program in this order. As a result, the previous packet, the packet number data and the current packet can be reproduced in this order. Therefore, when the recorded program is reproduced, the locations of the packets can be easily restored to the state when these packets were arranged in the multiplexed data.

In the data recording method of the present invention, when the packet number data is generated, if there is no packet which is contained in the program except for the at least one program to be extracted from the multiplexed data between the packet previously extracted in the packet extracting process and the packet currently extracted in the packet extracting process, the packet number data indicating that there is no packet is generated. As a result, regardless of whether or not there is a packet contained in the program other than one program to be extracted between the packets contained in the program to be extracted, the packet number data can always be generated. Therefore, it is possible to make the structure of the recorded program simple.

In order to reproduce the recorded program, a data reproducing method includes the processes of: reading the packets and the packet number data from the program extracted by the data recording method; reproducing the packets read in the reading process; and setting a period of time necessary for reproducing the packet or the packets whose number is indicated by the packet number data read in the reading process between a reproduction of the packet previously read in the reading process and a reproduction of the packet currently read in the reading process. In this data reproducing method, by using the packet number data included in the recorded program, the locations of the packets read out from the recorded program can be easily restored to the state when these packets were placed in the multiplexed data. Hence, the recorded program can be reproduced at high precision.

Furthermore, the time period setting process of the data reproducing method may includes the processes of: generating a blank packet or a plurality of blank packets whose number is indicated by the packet number data read in the reading process; and inserting the blank packet or the plurality of blank packets generated in the generating process between the packet previously read in the reading process and the packet currently read in the reading process. Each blank data contains no data to be reproduced, but the blank packets correspond to the packets which were placed between the packets contained in one program to be extracted in the multiplexed data in time. Therefore, only if the blank packets are reproduced together with the ordinary packets, the locations of the packets (ordinary packets) can be much easily restored to the state when these packets were placed in the multiplexed data.

The above-mentioned object can be achieved by a data recording apparatus in accordance with the present invention. The data recording apparatus includes: a receiving device for receiving multiplexed data including a plurality of programs from an external source; an extracting device for extracting at least one program out of the programs included in the received multiplexed data; and a recording device for recording the extracted at least one program. Each of programs is divided into a plurality of packets. The programs are time-division multiplexed as the multiplexed data by a unit of the packet. The extracting device includes: a packet extracting device for extracting the packets composing the at least one program to be extracted from the multiplexed data; a generating device for generating packet number data indicating the number of the packet which is a part of the program except for the at least one program to be extracted from the multiplexed data, and which is located in the multiplexed data and located between the packet previously extracted by the packet extracting device and the packet currently extracted by the packet extracting device; and a recording device for recording the packets extracted by the packet extracting device and the packet number data generated by the generating device.

In this data recording apparatus, the recording device may inserts the packet number data between the packet previously extracted by the packet extracting device and the packet currently extracted by the packet extracting device.

Furthermore, in the data recording apparatus, if there is no packet which is the part of the program except for the at least one program to be extracted from the multiplexed data between the packet previously extracted by the packet extracting device and the packet currently extracted by the packet extracting device, the generating device may generate the packet number data indicating that there is no packet.

Meanwhile, in order to reproduce the recorded program recorded by the above mentioned data recording method, a data reproducing apparatus of the present invention is provided. The data reproducing apparatus includes: a reading device for reading the packets and the packet number data from the program extracted by using the above-mentioned data recording method; a reproducing device for reproducing the packets read by the reading device; and a setting device for setting a period of time necessary for reproducing the packet or the packets whose number is indicated by the packet number data read in the reading process between a reproduction of the packet previously read by the reading device and a reproduction of the packet currently read by the reading device.

In this data reproducing apparatus, the setting device may includes: a blank packet generating device for generating a blank packet or a plurality of blank packets whose number is indicated by the packet number data read by the reading device; and an inserting device for inserting the blank packet or the plurality of blank packets generated by the generating device between the packet previously read by the reading device and the packet currently read by the reading device.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be described. In the description set forth hereinafter, the present invention is embodied in a case of extracting and recording desired one program data out of multiplexed data (hereinafter referred to as "TS data") in which a plurality of program data are time-division multiplexed by the transport stream system in the MPEG 2.

Figure 1:
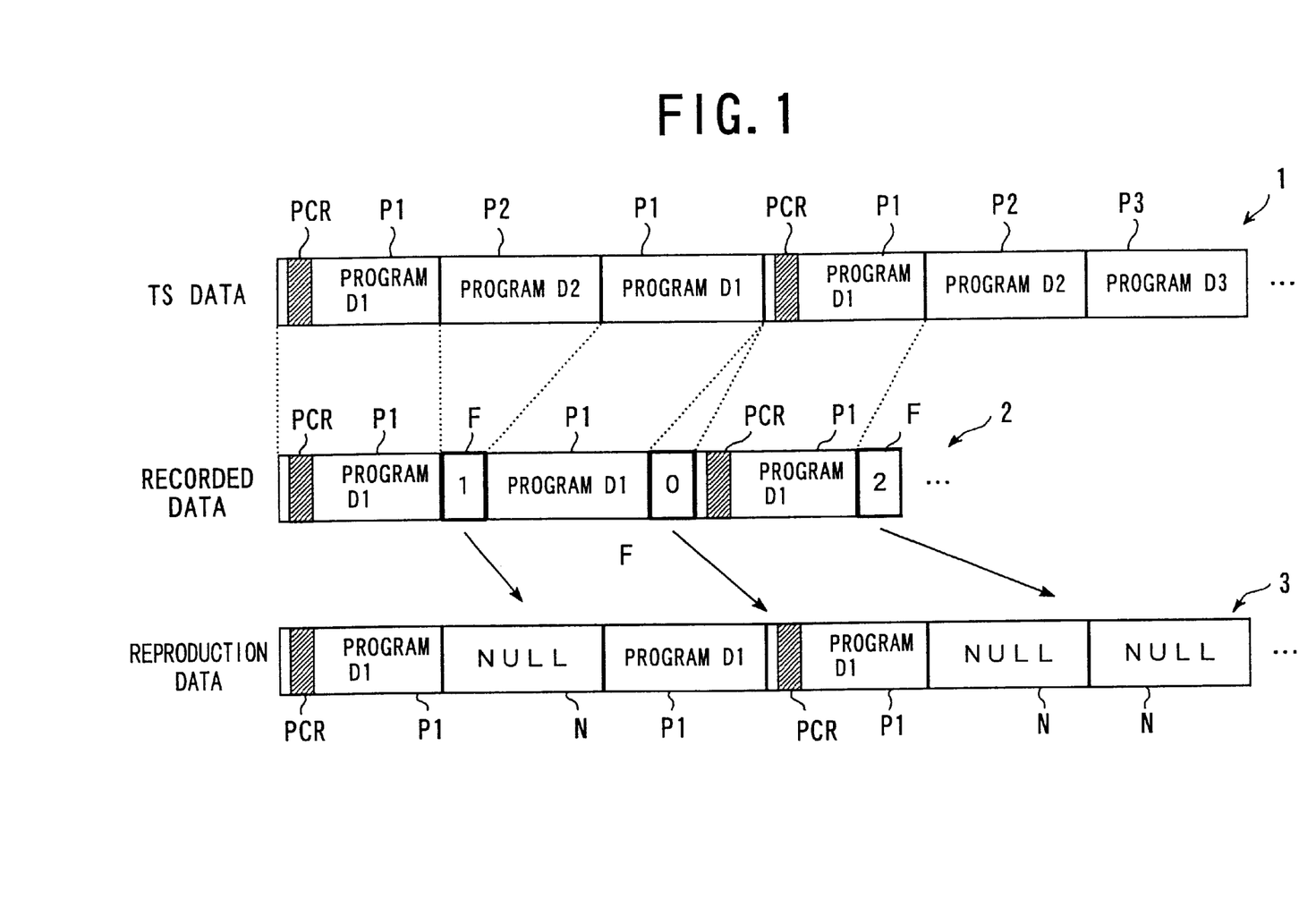
FIG. 1 is a diagram showing TS data, recorded data and reproduced data of an embodiment of the present invention.

I. Structure of TS Data:

The structure of the TS data will be explained with reference to FIG. 1. As shown in FIG. 1, the TS data 1 is data in which a plurality of program data are time-division multiplexed by the transport stream system in the MPEG 2. The program data are sound data, picture data, image data, character data, control data, signal processing data and others or data in which all of or part of those data are combined, e.g., video data and audio data for reproducing a movie or a film. The plurality of program data means data including a plurality of movies or films. In FIG. 1, the plurality of program data D1, D2 and D3 are divided into packets P1, P2 and P3 and are arrayed within the TS data 1. That is, the respective packets P1 compose the first program data D1, the respective packets P2 compose the second program data D2 and the respective packets P3 compose the third program data D3. Here, the respective packets P1, P2 and P3 have a fixed length and the packet length is 188 bytes for example.

PCRs are disposed within the TS data 1 at predetermined intervals. The packet length of each packet does not necessarily coincide with the intervals along which the PCRs are disposed, so that there exist packets in which the PCR is disposed and packets in which no PCR is disposed. For instance, although the PCR is disposed in the packet P1 of the TS data 1, no PCR is disposed in the packets P2 and P3 as shown in FIG. 1.

Figure 3:
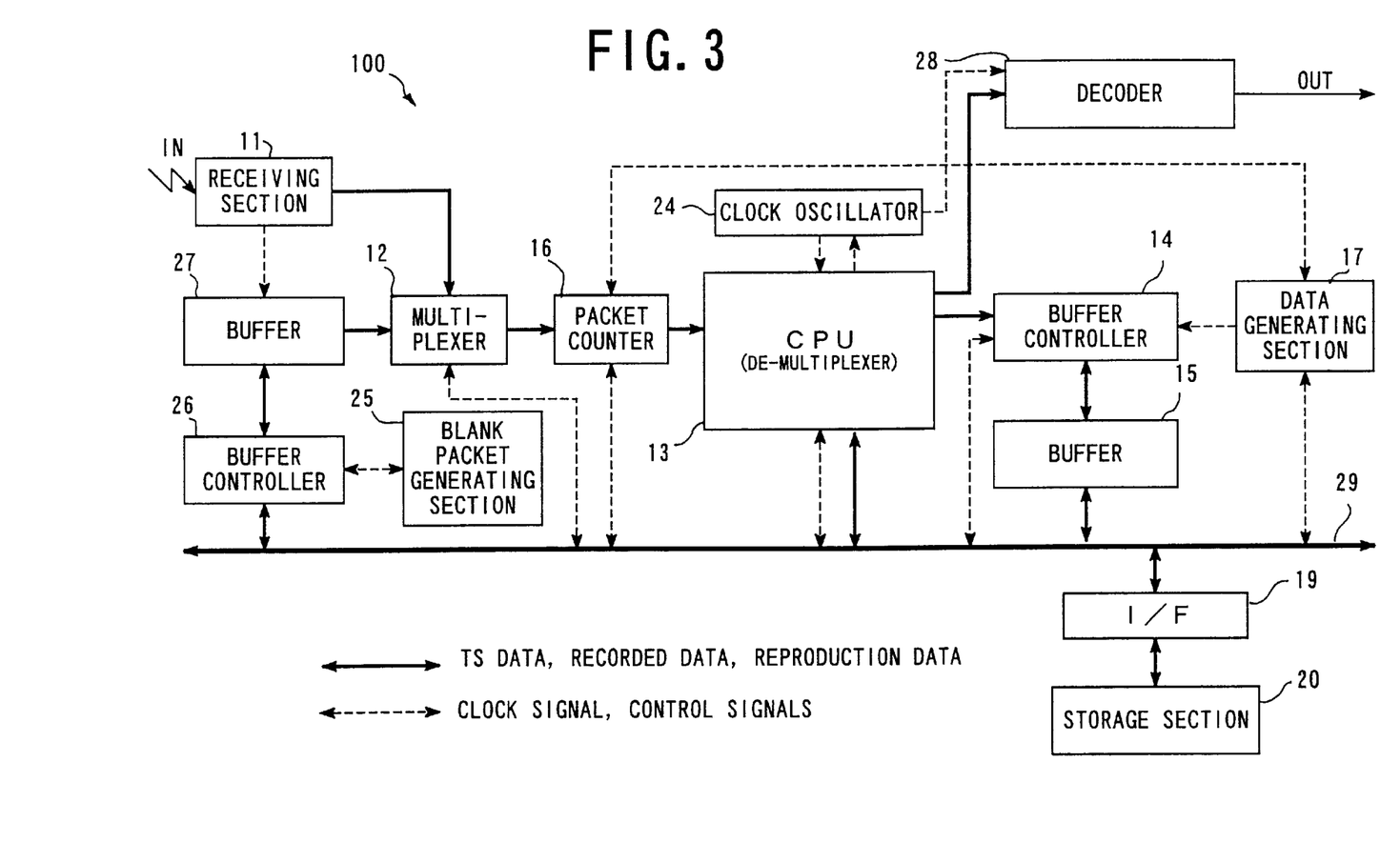
FIG. 3 is a block diagram showing a data recording/reproducing apparatus of the embodiment of the present invention.

The PCR is used to synchronize the program data and a data recording/reproducing apparatus 100 shown in FIG. 3, i.e., a transmitter (not shown) for transmitting the TS data 1 and the data recording/reproducing apparatus 100, in recording or reproducing the program data within the TS data 1 by the data recording/reproducing apparatus 100 for example.

Specifically, the PCR is a time stamp calculated from reference clock of the transmitter (internal clock of the transmitter) for transmitting the TS data 1 and is inserted within the TS data 1 at predetermined intervals by the transmitter. That is, the PCR indicates a passing of time while the TS data 1 is sequentially transmitted from the transmitter.

In concrete, a counter operating at 90 kHz and a counter operating at 27 MHz are provided within the transmitter. These two counters are synchronized. The transmitter counts time while transmitting the TS data 1 by using these two counters. Then, the transmitter generates the PCRs in which values of those two counters are recorded at a predetermined period and inserts the PCRs to the packets composing the TS data 1. That is, the values recorded in the PCR is the values indicative of the time when the packet in which the PCR is inserted is transmitted. In other words, the values recorded in the PCR are the values indicative of timing for decoding (reproducing) the packet in which the PCR is inserted. In concrete, the PCR is data of 42 bits of actual data, wherein the value of the counter operating at 90 kHz is recorded in the high order 33 bits and the value of the counter operating at 27 MHz is recorded in the low order 9 bits.

For instance, the data recording/reproducing apparatus 100 shown in FIG. 3 operates an internal counter based on a reference clock signal of 27 MHz output from a clock oscillator 24 provided therein while recording or reproducing the program data within the TS data 1 transmitted from the transmitter. The data recording/reproducing apparatus 100 compares the value of the PCR with the value of the internal clock and calculates the difference of the both every time when it receives the PCR disposed in the TS data 1 transmitted from the transmitter. Then, the data recording/reproducing apparatus 100 sets or calibrates the frequency of the reference clock signal so as to eliminate this difference. It is realized by constructing the clock oscillator 24 by a PLL circuit. Thereby, it becomes possible to synchronize the transmitter transmitting the TS data and the data recording/reproducing apparatus 100 and to reproduce or record the program data multiplexed into the TS data 1 transmitted from the transmitter at high precision.

II. Structure of Data Recording/Reproducing Unit:

FIG. 3 shows the structure of the data recording/reproducing apparatus 100 of the present embodiment. The data recording/reproducing apparatus 100 has functions of receiving the TS data 1 transmitted from the transmitter (not shown) provided in a broadcasting station (not shown) providing the digital satellite broadcasting service for example, extracting the respective packets P1 composing one desired program data D1 out of the TS data 1, reconstructing the respective extracted packets P1 to generate recorded data 2 and recording it to a recording medium as one program data independent of the TS data 1. The data recording/reproducing apparatus 100 has also a function of reproducing the program data multiplexed in the TS data 1 transmitted from the transmitter, further has a function of reproducing the recorded data 2.

As shown in FIG. 3, the data recording/reproducing apparatus 100 comprises, a receiving section 11, a multiplexer 12, a CPU 13, a recording buffer controller 14, a recording buffer 15, a packet counter 16, a data generating section 17, an interface 19 for storage section, a storage section 20, the clock oscillator 24, a blank packet generating section 25, a reproducing buffer controller 26, a reproducing buffer 27, a decoder 28 and a bus 29.

The receiving section 11 receives the TS data 1 transmitted from the transmitter. The multiplexer 12 controls the switching operation in order to supply alternatively either one of the TS data 1 output from the receiving section 11 and the recorded data 2 output from the reproducing buffer 27 to the CPU 13.

The CPU 13 conducts operations of the data recording/reproducing apparatus 100, e.g., a recording operation and a reproducing operation. The CPU 13 has also a function as a de-multiplexer and performs a process of extracting packets composing one program data out of the TS data 1 in which a plurality of program data are multiplexed and a process of reading each PCR from the TS data 1 for example. The CPU 13 is operated according to a reference clock signal supplied from the clock oscillator 24, and outputs an extracted packet to the recording buffer controller 14 and the decoder 28 according to the time unit that is based on the reference clock.

The buffer controller 14 conducts a memory management and control of the buffer 15 and outputs the packets supplied from the CPU 13 to the buffer 15. The buffer 15 temporarily holds the packets output from the buffer controller 14 and outputs the packets to the storage section 20 while regulating timing of the output corresponding to the rate of storage operation of the storage section 20. The buffer controller 14 performs a process of inserting data representing the number of blank packets to the recorded data 2, cooperating with the packet counter 16 and the data generating section, as described later.

The packet counter 16 is connected between the multiplexer 12 and the CPU 13. Therefore, the TS data 1 or the recorded data 2 output from the multiplexer 12 is supplied to the CPU 13 through the packet counter 16. Meanwhile, in the data recording/reproducing apparatus 100, when the recording operation is performed as described later, the packet counter 16 counts the number of the packets that are to be discarded, and outputs the count value representing the number of the packets that are to be discarded to the data generating section 17. The packet counter 16 resets the count value at the initialize number "0", when the control signal is supplied from the CPU 13.

The data generating section 17 is, for example, a sub CPU or a multi-processing unit. The data generating section 17 performs the process of inserting data representing the number of blank packets to the recorded data 2. In addition, the data generating section 17 may be installed in the CPU 13 as a part of the CPU 13.

The storage section 20 is structured by a RAM, a harddisk or the like for example and stores (records) the recorded data 2 created by rearranging the packets output from the buffer 15 via the bus 29 and the interface 19 for the storage section. It is noted that the storage section 20 may be structured by a magnetic disk drive, an optical disk drive, a magnetic tape recording unit or the like so as to store the packets output from the buffer 15 in a magnetic disk, an optical disk, a magnetic tape or the like.

The clock oscillator 24 has the PLL circuit and outputs the reference clock signal of 27 MHz to the CPU 13 and the decoder 28. The clock oscillator 24 sets or calibrates the frequency of own reference clock signal based on the value of the PCR output from the CPU 13.

The blank packet generating section 25 is structured by, for example, a sub CPU or a multi-processing unit. When the reproducing operation is performed by the data recording/reproducing apparatus 100, the blank packet generating section 25 carries out a process of inserting blank packets to the reproduction data 3. In addition, the blank packet generating section 25 may be installed in the CPU 13 as a part of the CPU 13.

The buffer controller 26 conducts a memory management and control of the buffer 27. The buffer 27 temporarily holds the recorded data 2 read from the storage section 20 and input via the bus 29 and the buffer controller 26 in reproducing the recorded data 2 stored in the storage section 20.

The decoder 28 decodes the recorded data 2 output from the CPU 13 based on the reference clock signal to output audio and video signals in reproducing the recorded data 2 stored in the storage section 20.

Figure 2:
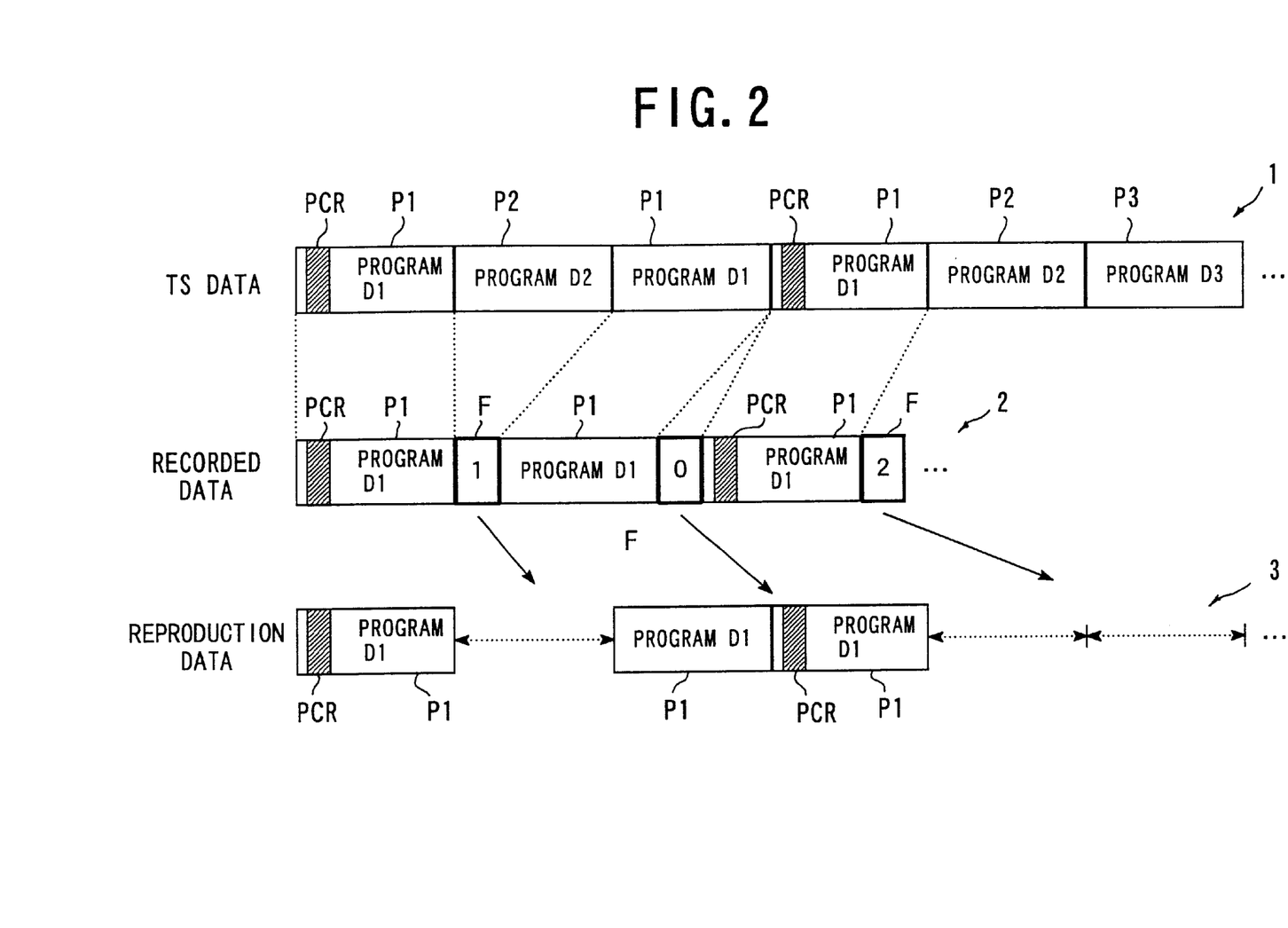
FIG. 2 is a diagram showing TS data, recorded data and reproduced data of an embodiment of the present invention.

III. Program Data Recording Operation:

A program data recording operation will be described with reference to FIGS. 1 and 2.

In the recording/reproducing apparatus 100, when the recording operation is started, the TS data 1 transmitted from the transmitter is received by the receiving section 11, and input to the CPU 13 via the multiplexer 12 and the packet counter 16, as shown in FIG. 3. At this time, the packet counter 16 counts the number of the packets of the TS data 1.

The CPU 13 reads the PCRs disposed in the TS data 1 and outputs them to the clock oscillator 24. Based on the PCRs output from the CPU 13, the clock oscillator 24 sets or calibrates the frequency of the clock signal. Thereby, the synchronization between the transmitter and the data recording/reproducing apparatus 100 is established.

In parallel with such process for establishing the synchronization, the CPU 13 extracts the packets P1 composing one desired program data D1 out of the plurality of program data multiplexed in the TS data 1 and outputs the extracted packets P1 to the buffer controller 14. Along with that, it is also possible to arrange so as to output the packets P1 to the decoder 28 to decode them by the reference clock signal and to output the audio and video signals. Meanwhile, the CPU 13 discards the packets P2 and P3 composing the program data D2 and D3, except of one desired program data D1.

When the packet P1 is extracted from the TS data 1, the CPU 13 outputs the control signal to the packet counter 16 in order to reset the count value of the packet counter 16 at the initialize number "0". As a result, the count value is initialized each time the packet P1 is extracted from the TS data 1. This means that the number of the packets that are to be discarded is only counted.

The packet P1 extracted by the CPU 13 is supplied to the buffer controller 14. Then, the buffer controller 14 performs the process of inserting the value representing the number of blank packets to the recorded data 2, cooperating with the packet counter 16 and the data generating section 17.

In the process of inserting the value representing the number of blank packets, the data generating section 17 generates the value representing the number of blank packets (it is referred to as "BPN data F" (Blank Packet Number data F), hereinafter.) on the basis of the count value supplied from the packet counter 16. As shown in FIG. 1, the BPN data F represents the total number of the discarded packets P2 and P3 which have existed between the previously extracted packet P1 and the currently extracted packet P1. The number of the discarded packets which have existed between the previous extracted packet P1 and the currently extracted packet P1 is referred to as a "discarded packet number".

For example, as shown in FIG. 1, if there is one packet P2 between two packets P1 in the TS data 1, the discarded packet number is one. Therefore, the BPN data F is "1". If there is no packet other than the packet P1 between the packets P1, the discarded packet number is zero. Therefore, the BPN data F is "0", which indicates that there is no packet. If there are one packet P2 and one packet P3 between the packets P1, the discarded packet number is two. Therefore, the BPN data F is "2".

The data generating section 17 uses the count value supplied from the packet counter 16 to generate the BPN data F. In concrete, the data generating section 17 receives data that consists of a predetermined number of bits and that represents the count value, from the packet counter 16, and adds a predetermined header to the received data. In addition, the header of the BPN data F may be the same as the header of each packet P1, P2 or P3. The header different from that of each packet P1, P2 or P3 may be used as the header of the BPN data F. Moreover, it is possible to add no header to the BPN data F. In this case, only the data that consists of a predetermined number of bits and that represents the count value is directly inserted between packets as the BPN data F. If this way is adopted, the BPN data F can be identified depending on the length of the packet, because the length of each packet is the same but the length of the BPN data F is different from it.

The BPN data F generated by the data generating section 17 is supplied from the data generating section 17 to the buffer controller 14. Then, the buffer controller 14 inserts the BPN data F to the place immediately before the packet P1 currently extracted by the CPU 13. Then, the buffer controller 14 outputs the inserted BPN data F and the currently extracted packet P1 to the buffer 15 in this order.

The buffer 15 outputs the BPN data F and the packet P1 received from the buffer controller 14 to the storage section 20 via the interface 19. At this stage, the BPN data F is placed between the previous packet P1 and the current packet P1. As a result, the recorded data 2 shown in FIG. 1 is formed in the storage section 20. Then, this recorded data 2 is stored in the storage section 20. In addition, at this time, the PCRs disposed within the packets are also stored in the storage section 20 without modification.

According to the data recording/reproducing apparatus 100, desired one program data can be extracted from the TS data 1 and recorded as the recorded data 2 which is independent of the TS data 1. As shown in FIG. 1, the amount of the recorded data 2 is smaller than that of the TS data 1.

IV. Program Data Reproducing Operation:

Referring to FIGS. 1 and 3, a reproducing operation of the data recording/reproducing apparatus 100 will be described.

When the extracted one program data, i.e., the recorded data 2 stored in the storage section 20 is reproduced in the data recording/reproducing apparatus 100, the packets P1 and the BPN data F of the recorded data 2 are read out from the storage section 20, and they are sequentially supplied to the buffer controller 26 via the interface 19 and the bus 29.

The buffer controller 26 receives the packets P1 and the BPN data F one after another. Then, the buffer controller 26 determines whether the packets P1 is received or the BPN data F is received. If the packet P1 is received, the buffer controller 26 outputs the received packet P1 to the buffer 27. If the BPN data F is received, the buffer controller 26 executes the process of inserting blank packets to the reproduction data 3, cooperating with the blank packet generating section 25.

In concrete, in the process of inserting blank packets to the reproduction data 3, the buffer controller 26 requests the blank packet generating section 25 to generate the blank packets N (NULL packets). That is, when the buffer controller 26 receives the BPN data F, the buffer controller 26 issues an instruction to generate the blank packets N and an instruction to indicate the number of blank packets N to be generated, to the blank packet generating section 25. At this time, the number of the blank packets N to be generated is indicated by the received BPN data F. In response to these instructions, the blank packet generating section 25 generates the indicated number of the blank packets N, and outputs them to the buffer controller 26. The blank packet N is a packet in which no data is contained. The length of the blank packet N is the same as that of the ordinary packet P1, for example, 188 bytes. In addition, only the header may be recorded in the blank packet N. Then, the buffer controller 26 receives the blank packets N from the blank packet generating section 25, and outputs them to the buffer 27.

The buffer 27 receives the packets P1 and the blank packets N from the buffer controller 26, and outputs them toward the CPU 13 as the reproduction data 3. The reproduction data 3 is sent to the CPU 13 via the multiplexer 12 and the packet counter 26. The reproduction data 3 is shown in FIG. 1.

As shown in FIG. 1, In the reproduction data 3, one or some blank packets are inserted between the packets P1. The number of the inserted blank packets corresponds to the number of the packets that are discarded at the time of recording, i.e., the discarded packet number. Therefore, the locations of the packets P1 in the reproduction data 3 are the same as the locations of the packets P1 in the TS data 1 in time. As a result, the locations of the PCRs in the reproduction data 3 is the same as the locations of the PCRs in the TS data 1 in time.

The CPU 13 receives such a reproduction data 3, and reads out the PCRs from the received reproduction data 3, and outputs them to the clock oscillator 24. The clock oscillator 24 sets or calibrates the reference clock signal on the basis of the PCRS, in order to establish the synchronization between the reproduction data 3 and the data recording/reproducing apparatus 100. Then, the packet P1 included in the reproduction data 3 received by the CPU 13 is fed into the decoder 28, converted into the audio signals and video signals, and output to speakers and a monitor (not shown).

As can be understood from the above, in the data recording/reproducing apparatus 100, the reproduction data 3 is generated by using packets P1 composing the desired one program data D1 and blank packets N generated instead of the discarded packets P2 and P3, and the number of the blank packets N is determined by the BPN data F which is recorded in the recorded data 2. Therefore, the locations of the packets P1 in the reproduction data 3 can be matched to the locations of the packet P1 in the TS data 1, respectively. Therefore, the intervals of the PCRs arranged in the reproduction data 3 can be matched to the intervals of the PCRs in the TS data 1. Hence, it is possible to establish the accurate synchronization between the reproduction data 3 and the data recording/reproducing apparatus 100, and to reproduce the reproduction data 3, namely, the one program data extracted from the TS data 1 accurately.

Furthermore, in the data recording/reproducing apparatus 100, as both the contents of the PCRs and the intervals of the PCRs are not modified when one program data is extracted from the TS data 1. That is, according to the data recording/reproducing apparatus 100, it is not necessary to generate the new PCRs to reconstruct the extracted program data. Therefore, in the recording operation of the data recording/reproducing apparatus 100, measurement of the recording time, which needs complicated processes, is not needed.

In addition, although the blank packets N indicated by the BPN data F are inserted between the packets P1 to generate the reproduction data 3, the present invention is not limited to this. For example, when the recorded data 2 is reproduced, if the BPN data F included in the recorded data 2 is read out after the packet P1 is read out, the CPU 13 may wait the period of time necessary for reproducing the packet or the packets whose number is indicated by the BPN data F to adjust an interval between the previous packet P1 and the next packet P1.

Furthermore, according to the above-described embodiment, if there is no packet other than the packet P1 between the packets P1 when the recorded data 2 is generated, the BPN data F representing "0" is inserted to the recorded data 2. However, the insertion of the BPN data representing "0" may be omitted.

Moreover, although the case of extracting and recording one program data out of the TS data multiplexed by the transport stream system in the MPEG 2 has been exemplified in the embodiment described above, the present invention is not confined to such case. The present invention may be adapted to a method of extracting program data out of other types of multiplexed data.

Still more, although the case in which the inventive data recording method is applied to the data recording/reproducing apparatus 100 having the data recording and data reproducing functions has been exemplified in the embodiment described above, the present invention is not confined only to such case and is applicable to a data recording apparatus having only the data recording function.

It is noted that the TS data is a concrete example of the multiplexed data and the PCR is a concrete example of the time preset value.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-092674 filed on Mar. 20, 1998 including the specification, claims, drawings and summary is incorporated herein by reference in its entirety.

What is claimed is:

1. A data recording method comprising the processes of:
   receiving multiplexed data including a plurality of programs from an external source;
   extracting at least one program out of the plurality of programs included in the received multiplexed data; and
   recording the extracted at least one program, wherein each of said plurality of programs is divided into a plurality of packets, the programs are time-division multiplexed as the multiplexed data by a unit of the packet, and the extracting process comprises the processes of:
      extracting, the packets composing the at least one program to be extracted from the multiplexed data;
      generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process; and
   recording the packets extracted in the packet extracting process and the packet number data generated in the generating process.

2. The method according to claim 1, wherein, in the recording process, the packet number data is inserted between the packet previously extracted in the packet extracting process and the packet currently extracted in the packet extracting process.

3. The method according to claim 1, wherein, in the generating process, if there is no packet pertaining to programs different from the at least one program to be extracted from the multiplexed data between the packet previously extracted in the packet extracting process and the packet currently extracted in the packet extracting process, the packet number data indicates that there is no packet.

4. The method according to claim 1, wherein the programs are multiplexed as the multiplexed data by a transport stream system standardized by an MPEG (Moving Picture Experts Group).

5. A data reproducing method of reproducing a program extracted from multiplexed data by using a data recording method, the data recording method comprising the processes of:
   receiving the multiplexed data including a plurality of programs from an external source;
   extracting at least one program out of the plurality of programs included in the received multiplexed data; and
   recording the extracted at least one program, each of said plurality of programs being divided into a plurality of packets, the programs being time-division multiplexed as the multiplexed data by a unit of the packet,
   the extracting process of the data recording method comprising the processes of:

extracting the packets composing the at least one program to be extracted from the multiplexed data;

generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process; and recording the extracted packets and the packet number data, the data reproducing method comprising the processes of:

reading the packets and the packet number data from the at least one extracted program;

reproducing the packets read in the reading process; and setting a period of time necessary for reproducing the packet or the packets whose number is indicated by the packet number data read in the reading process between a reproduction of the packet previously read in the reading process and a reproduction of the packet currently read in the reading process.

6. The method according to claim 5, wherein the setting process comprises the processes of:

generating a blank packet or a plurality of blank packets whose number is indicated by the packet number data read in the reading process; and inserting the blank packet or the plurality of blank packets generated in the generating process between the packet previously read in the reading process and the packet currently read in the reading process.

7. The method according to claim 5, wherein the programs are multiplexed as the multiplexed data by a transport stream system standardized by an MPEG (Moving Picture Experts Group).

8. A data recording apparatus comprising:

a receiving device for receiving multiplexed data including a plurality of programs from an external source;

an extracting device for extracting at least one program out of the plurality of programs included in the received multiplexed data; and a recording device for recording the extracted at least one program, wherein each of said plurality of programs is divided into a plurality of packets, the programs are time-division multiplexed as the multiplexed data by a unit of the packet, and the extracting device comprises:

a packet extracting device for extracting the packets composing the at least one program to be extracted from the multiplexed data;

a generating device for generating packet number data indicating a number of packets pertaining to programs different from the at least one program to be extracted from the multiplexed data, said packet number data being located in the multiplexed data between a packet previously extracted by the packet extracting device and a packet currently extracted by the packet extracting device; and a recording device for recording the packets extracted by the packet extracting device and the packet number data generated by the generating device.

9. The apparatus according to claim 8, wherein the recording device inserts the packet number data between a packet previously extracted by the packet extracting device and a packet currently extracted by the packet extracting device.

10. The apparatus according to claim 8, wherein if there is no packet pertaining to programs different from the at least one program to be extracted from the multiplexed data between the packet previously extracted by the packet extracting device and the packet currently extracted by the packet extracting device, the generating device generates the packet number data indicating that there is no packet.

11. The apparatus according to claim 8, wherein the programs are multiplexed as the multiplexed data by a transport stream system standardized by an MPEG (Moving Picture Experts Group).

12. A data reproducing apparatus for reproducing a program extracted from multiplexed data by using a data recording method, the data recording method comprising the processes of:

receiving multiplexed data including a plurality of programs from an external source;

extracting at least one program out of the plurality of programs included in the received multiplexed data; and recording the extracted at least one program, each of said plurality of programs being divided into a plurality of packets, the programs being time-division multiplexed as the multiplexed data by a unit of the packet, the extracting process of the data recording method comprising the processes of:

extracting the packets composing the at least one program to be extracted from the multiplexed data;

generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process; and recording the packets extracted in the packet extracting process and the packet number data generated in the generating process, the data reproducing apparatus comprising:

a reading device for reading the packets and the packet number data from the at least one extracted program;

a reproducing device for reproducing the packets read by the reading device; and a setting device for setting a period of time necessary for reproducing the packet or the packets whose number is indicated by the packet number data read in the reading process between a reproduction of the packet previously read by the reading device and a reproduction of the packet currently read by the reading device.

13. The apparatus according to claim 12, wherein the setting device comprises:

a blank packet generating device for generating a blank packet or a plurality of blank packets whose number is indicated by the packet number data read by the reading device; and an inserting device for inserting the blank packet or the plurality of blank packets generated by the generating device between the packet previously read by the reading device and the packet currently read by the reading device.

14. The apparatus according to claim 12, wherein the programs are multiplexed as the multiplexed data by a transport stream system standardized by an MPEG (Moving Picture Experts Group).

15. A data recording method comprising the processes of:

receiving multiplexed data including a plurality of programs from an external source;

extracting at least one program out of the plurality of programs included in the received multiplexed data; and recording the extracted at least one program, wherein each of said plurality of programs is divided into a plurality of packets, the programs are lime-division multiplexed as the multiplexed data by a unit of the packet and the extracting process comprises the processes of:

extracting the packets composing the at least one program to be extracted from the multiplexed data; generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process;

comparing an external source time value of an external source reference clock relating to the multiplexed data with an internal data recording time value of an internal reference clock;

adjusting a frequency of the internal reference dock to eliminate a difference between the external source time value and the internal data recording time value;

outputting the packets extracted in the packet extracting process to a recording buffer controller in accordance with the internal reference clock and recording the packets extracted in the packet extracting process and the packet number data generated in the generating process.

16. The data recording method of claim 15, further comprising, between the processes of outputting the packets extracted in the packet extracting process to a recording buffer controller and recording the packets extracted in the packet extracting process, a process of outputting the packets extracted in the packet extracting process to a storage section, wherein an output timing of the process of outputting the packets extracted in the packet extracting process to a storage section is regulated according to a storage timing of the storage section.

17. A data reproducing method of reproducing a program extracted from multiplexed data by using a data recording method, the data recording method comprising the processes of:

receiving the multiplexed data including a plurality of programs from an external source;

extracting at least one program out of the plurality of programs included in the received multiplexed data; and recording the extracted at least one program, each of said plurality of programs being divided into a plurality of packets, the programs being time-division multiplexed as the multiplexed data by a unit of the packet, the extracting process of the data recording method comprising the processes of:

extracting the packets composing the at least one program to be extracted from the multiplexed data;

generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process; and recording the extracted packets and the packet number data, the data reproducing method comprising the processes of: reading the packets and the packet number data from the extracted program;

comparing an external source time value of an external source reference clock relating to the multiplexed data with an internal data recording time value of an internal reference clock;

adjusting a frequency of the internal reference clock to eliminate a difference between the external scum time value and the internal data recording time value;

outputting the packets read in the reading process to a recording buffer controller in accordance with the internal reference dock reproducing the packets read in the reading process; and setting a period of time necessary for reproducing the packet or the packets whose number is indicated by the packet number data read in the reading process between a reproduction of the packet previously read in the reading process and a reproduction of the packet currently read in the reading process.

18. The data reproducing method of claim 17, further comprising, between the processes of outputting the packets read in the reading process to a recording buffer controller and reproducing the packets read in the reading process, a process of outputting the packets read in the reading process to a storage section, wherein an output timing of the process of outputting the packets read in the reading process to a storage section is regulated according to a reproduction timing of the storage section.

19. A data recording apparatus comprising:

a receiving device for receiving multiplexed data including a plurality of programs from an external source;

an extracting device for extracting at least one program out of the plurality of programs included in the received multiplexed data; and a recording device for recording the extracted at least one program, wherein each of said plurality of programs is divided into a plurality of packets, the programs are time-division multiplexed as the multiplexed data by a unit of the packet and the extracting device comprises:

a packet extracting device for extracting the packets composing the at least one program to be extracted from the multiplexed data;

a generating device for generating packet number data indicating a number of packets pertaining to programs different from the at least one program to be extracted from the multiplexed data, said packet number data being located in the multiplexed data between a packet previously extracted by the packet extracting device and a packet currently extracted by the packet extracting device;

a comparing device for comparing an external source time value of an external source reference clock relating to the multiplexed data with an internal data recording time value of an internal reference dock;

an adjusting device for adjusting a frequency of the internal reference clock to eliminate a difference between the external source time value and the internal data recording time value;

a first outputting device for outputting the packets extracted in the packet extracting process to a recording buffer controller in accordance with the internal reference clock; and a recording device for recording the packets extracted by the packet extracting device and the packet number data generated by the generating device.

20. The data recording device of claim 19, further comprising a second outputting device for outputting the packets extracted in the packet extracting process to a storage section, wherein an output timing of the second outputting device is regulated according to a storage timing of the storage section.

21. A data reproducing apparatus for reproducing a program extracted from multiplexed data by using a data recording method, the data recording method comprising the processes of:

receiving multiplexed data including a plurality of programs from an external source;

extracting at least one program out of the plurality of programs included in the received multiplexed data; and recording the extracted at least one program, each of said plurality of programs being divided into a plurality of packets, the programs being time-division multiplexed as the multiplexed data by a unit of the packet the extracting process of the data recording method comprising the processes of: extracting the packets composing the at least one program to be extracted from the multiplexed data;

generating packet number data indicating a number of packets pertaining to programs different from the at least one program to be extracted from the multiplexed data, said packet number data being located in the multiplexed data between a packet previously extracted in the packet extracting process and a packet currently extracted in the packet extracting process; and recording the packets extracted in the packet extracting process and the packet number data generated in the generating process, the data reproducing apparatus comprising:

a reading device for reading the packets and the packet number data from the at least one extracted program;

a comparing device for comparing an external source time value of an external source reference clock relating to the multiplexed data with an Internal data recording time value of an internal reference clock;

an adjusting device for adjusting a frequency of the internal reference clock to eliminate a difference between the external source time value and the internal data recording lime value;

a first outputting device for outputting packets to a recording buffer controller in accordance with the internal reference dock;

a reproducing device for reproducing packets read from the recording buffer controller; and a setting device for setting a period of time necessary for reproducing the packet or die packets whose number is indicated by the packet number data read in the reading process between a reproduction of the packet previously read by the reading device and a reproduction of the packet currently read by the reading device.

22. The data reproducing apparatus of claim 21, further comprising a second outputting device for outputting the packets read in the read to a storage section, wherein an output timing of the second outputting device is regulated according to a reproduction timing of the storage section.

\* \* \* \* \*